US012754444B2

(12) United States Patent
Badcock et al.

(10) Patent No.: US 12,754,444 B2
(45) Date of Patent: Oct. 6, 2026

(54) ELECTRO-OPTIC MODULATOR AND METHODS OF FORMING THE SAME

(71) Applicant: Paragraf Limited, Somersham (GB)

(72) Inventors: Thomas James Badcock, Somersham (GB); Ivor Guiney, Somersham (GB)

(73) Assignee: PARAGRAF LIMITED, Somersham (GB)

( * ) Notice: Subject to any disclaimer, the term of this patent is extended or adjusted under 35 U.S.C. 154(b) by 286 days.

(21) Appl. No.: 18/556,253

(22) PCT Filed: Apr. 27, 2022

(86) PCT No.: PCT/EP2022/061248

§ 371 (c)(1),
(2) Date: Oct. 19, 2023

(87) PCT Pub. No.: WO2022/229282

PCT Pub. Date: Nov. 3, 2022

(65) Prior Publication Data

US 2024/0192530 A1 Jun. 13, 2024

(30) Foreign Application Priority Data

Apr. 29, 2021 (GB) ...................................... 2106149

(51) Int. Cl.

*G02F 1/03* (2006.01)
*G02F 1/00* (2006.01)
*G02F 1/035* (2006.01)

(52) U.S. Cl.

CPC .......... *G02F 1/0316* (2013.01); *G02F 1/0018* (2013.01); *G02F 1/035* (2013.01)

(58) Field of Classification Search

CPC ...... G02F 1/0316; G02F 1/0018; G02F 1/035; H10F 77/169; H10F 30/10; H10F 55/205; H10F 77/413

See application file for complete search history.

(56) References Cited

U.S. PATENT DOCUMENTS 9,360,689 B2 6/2016 Liu et al.
10,466,571 B2 11/2019 Phare et al.
(Continued)

FOREIGN PATENT DOCUMENTS

CN 105022178 A 11/2015
CN 106200017 A 12/2016
(Continued)

OTHER PUBLICATIONS

Combined Search and Examination Report for related United Kingdom Application No. GB2106149.4, dated Oct. 19, 2021, 10 pages.
(Continued)

*Primary Examiner* — John Bedtelyon
(74) *Attorney, Agent, or Firm* — Stinson LLP

(57) ABSTRACT

There is provided an electro-optic modulator comprising: a substrate having a first channel of waveguide material embedded therein, the substrate and the waveguide material together providing a substantially flat upper surface, a first insulative layer on and across the upper surface; a graphene layer arranged on the first insulative layer and over at least a first portion of the first channel of waveguide material; and a second insulative layer provided on and across the graphene layer; wherein the graphene layer provides a first electrode, and wherein a, preferably non-graphene, second electrode is either: (i) provided on the second insulative layer at least overlapping the first portion of the first channel of waveguide material, or (ii) provided within the substrate at least underlapping the first portion of the first channel of waveguide material.

19 Claims, 3 Drawing Sheets

(56) References Cited

U.S. PATENT DOCUMENTS

| | | | | |
|---|---|---|---|---|
| 10,775,651 | B2 | 9/2020 | Dalir et al. | |
| 2013/0101247 | A1 | 4/2013 | Cho et al. | |
| 2014/0056551 | A1 | 2/2014 | Liu et al. | |
| 2015/0212386 | A1 | 7/2015 | Patel et al. | |
| 2018/0284561 | A1 | 10/2018 | Phare et al. | |
| 2018/0308684 | A1 | 10/2018 | Thomas et al. | |
| 2020/0149152 | A1 | 5/2020 | Park et al. | |
| 2023/0176280 | A1* | 6/2023 | Sung ...................... | G02B 6/107 385/14 |

FOREIGN PATENT DOCUMENTS

| | | | |
|---|---|---|---|
| CN | 105022178 | B | 4/2018 |
| CN | 108873395 | A | 11/2018 |
| CN | 110989216 | A | 4/2020 |
| JP | 2012138451 | A | 7/2012 |

OTHER PUBLICATIONS

Examination Report for related United Kingdom Application No. GB2106149.4, dated Aug. 3, 2023, 4 pages.

International Search Report and Written Opinion for International Application PCT/EP2022/061248, mailed Aug. 2, 2022, 17 pages.

Datta, I., et al. "Platform for ultra-strong modulation in hybrid silicon nitride/2D material photonic structures", Conference on Lasers and Electro-Optics, CLEO, 2020, SF2J.4, 2 pages.

Giambra, M.A., et al. "Wafer-Scale Integration of Graphene-Based Photonic Devices", ACS Nano, 2021, vol. 15, pp. 3171-3187.

Lee, B.S., et al. "High-performance integrated graphene electro-optic modulator at cryogenic temperature", Nanophotonics, 2021, vol. 10, No. 1, pp. 99-104.

Liu, J., et al. "Review of graphene modulators from the low to the high figure of merits", Journal of Physics D: Applied Physics, 2020, vol. 53, 233002, pp. 1-21.

Liu, M., et al. "A graphene-based broadband optical modulator", Nature, 2011, vol. 474, pp. 1-4.

Luo, S., et al. "Graphene-based optical modulators", Nanoscale Research Letters, 2015, vol. 10, No. 199, 11 pages.

Phare, C.T., et al. "30 GHz Zeno-based Graphene Electro-optic Modulator", Nature Photonics, vol. 9, No. 8, 11 pages.

Shiramin, L.A., et al. "Graphene Modulators and Switches Integrated on Silicon and Silicon Nitride Waveguide", IEEE Journal of Selected Topics in Quantum Electronics, 2017, vol. 23, No. 1, pp. 94-100.

Sorianello, V., et al. "Graphene on Silicon Modulators", Journal of Lightwave Technology, 2020, vol. 38, No. 10, pp. 2782-2789.

Sorianello, V., et al. "Graphene Phase Modulator", Mesoscale and Nanoscale Physics, 2018, vol. 12, 7 pages.

Sorianello, V., et al. "Graphene-silicon phase modulators with gigahertz bandwidth", Nature Photonics, 2018, vol. 12, pp. 40-45.

Joshi, S., et al. "Transition metal dichalcogenides integrated waveguide modulator and attenuator in silicon nitride platform", Nanotechnology, Institute of Physics Publishing, Briston, GB, 2020, vol. 31, No. 43, 9 pages.

* cited by examiner

ELECTRO-OPTIC MODULATOR AND METHODS OF FORMING THE SAME

REFERENCE TO RELATED APPLICATIONS

This application is the 371 U.S. National Stage application of International Patent Application No. PCT/EP2022/061248, filed Apr. 27, 2022, which claims the benefit of United Kingdom Application No. GB 2106149.4, filed Apr. 29, 2021, the entire disclosures of which are incorporated herein by reference.

The present invention provides an electro-optic modulator and methods of forming an electro-optic modulator. In particular, the electro-optic modulator comprises a graphene layer as a first electrode and a non-graphene layer as a second electrode. The present invention also provides methods for forming electro-optic modulators comprising such a graphene layer as an electrode, in particular methods which comprise forming a silicon nitride layer by low pressure chemical vapour deposition.

Two-dimensional materials, of which graphene is one of the most prominent, are currently the focus of intense research. Graphene in particular has been shown, both theoretically and in recent years practically, to demonstrate extraordinary properties. The electronic properties of graphene are especially remarkable and have enabled the production of electronic devices which are orders of magnitude improved over non-graphene based devices. Graphene also exhibits unique optical properties such that graphene has been used in electro-optic devices such as electro-optic modulators. An electro-optic modulator (EOM) is a device which can be used to control the power or amplitude, phase, frequency, or the polarisation of light with an electrical control signal. The principle of operation is based on the electro-optic effect which is the modification of the refractive index of a medium, caused by an electric field.

*IEEE Journal of Selected Topics in Quantum Electronics* 23(1), 94-100 (2017) "Graphene Modulators and Switches Integrated on Silicon and Silicon Nitride Waveguide" discloses electro-optic modulators comprising single layer graphene (SLG) and double layer graphene (DLG) configurations. *Nanoscale Research Letters* (2015) 10:199 "Graphene-based optical modulators" provides a nano review of graphene-based electro-optic modulators and their mechanism of function. *J. Phys. D: Appl. Phys.* 53:233002 (2020) "Review of graphene modulators from the low to the high figure of merits" provides a more recent review and comprehensive overview of graphene modulators known in the art. Graphene has been used in electro-optic modulators whereby the modulation is achieved by actively tuning the Fermi level of a monolayer graphene sheet and therefore its transparency.

*Nature* 474(7349), 64-67 (2011) "A graphene-based broadband optical modulator" discloses a gigahertz graphene modulator having an electro-absorption modulation of 0.1 dB $\mu m^{-1}$ which operates over a wavelengths of from 1.35 μm to 1.6 μm, under ambient conditions. The strong electro-absorption effect originates from the unique electronic structure of the two-dimensional material. Graphene is introduced to the device by mechanical transfer onto a Si waveguide. US 2014/056551 A1 relates to the same subject-matter sharing the same inventors and authors.

Similarly, *Nat. Photon.* 9(8), 511-514 (2015) "30 GHz Zeno-based Graphene Electro-optic Modulator" and *Nanophotonics* 10(1), 99-104 (2021) "High-performance integrated graphene electro-optic modulator at cryogenic temperature" disclose graphene EOMs comprising a dual-layer graphene capacitor integrated with a silicon nitride waveguide, the graphene sheets separated by an alumina layer. The graphene is CVD grown on a copper substrate and transferred by electrochemical delamination. WO 2016/073995 A1 relates to the same subject-matter sharing the same inventors and authors.

CN 110989216 A relates to a graphene optical modulator structure design using a waveguide layer that preferably is composed of a set of high refractive index waveguides and low refractive index waveguide.

CN 105022178 A provides a graphene phase optical modulator based on a planar waveguide.

US 2020/149152 A1 relates to a method for synthesizing a graphene pattern and an electro-optical modulator that may be manufactured by direct synthesis of a graphene pattern.

*Nat. Photon.* 12, 40-44 (2018) "Graphene-silicon phase modulators with gigahertz bandwidth" discloses a graphene phase modulator integrated in a Mach-Zehnder interferometer configuration "Platform for ultra-strong modulation in hybrid silicon nitride/2D material photonic structures" 2020 Conference on Lasers and Electro-Optics (CLEO 2020), relates to a graphene-TMD modulator integrated on silicon nitride photonic platform.

*ACS Nano* 15, 3171-3187 (2021) "Wafer-Scale Integration of Graphene-Based Photonic Devices" discloses a full process flow for SLG-based photonics on wafer-scale.

Graphene offers further advantages as a material compatible with CMOS processes. Accordingly, graphene has the potential to reduce the device footprint over silicon-based modulators and can be integrated with existing silicon-based electronic fabrication processes. However, there remains a need for electro-optic modulators which can deliver the potential of graphene to provide EOMs capable of being used in commercial photonic devices. Equally, there remains a need for suitable methods which can manufacture such devices with sufficient consistency and reliability for commercial device production. Graphene transfer processes do not meet this stringent requirement and are nevertheless not suitable for the scale up of mass manufacture of graphene-based devices.

EP 2 584 397 A1 discloses an optical electro-absorption modulator including two graphene sheets and a ridge optical waveguide formed on the upper surface of a semiconductor layer. The graphene transfer process permits the graphene to be applied over the ridged optical waveguide thereby covering the waveguide upper surface and a side surface.

U.S. Pat. No. 10,775,651 B2 discloses double-layer graphene optical modulators and methods of fabrication thereof. The device includes a substrate, a first electrically insulating material disposed over the substrate, a first graphene layer and a second graphene layer disposed in the first electrically insulating material and being separated by the first electrically insulating material. A waveguide is disposed on the first electrically insulating material wherein the waveguide overlays both the first and second graphene layers.

The present invention falls generally within the field of photonic integrated circuits (PICs) also referred to as integrated optical circuits. Despite the potential for graphene to revolutionise many fields including integrated photonics, the prior art fails to provide a reliable methods and/or devices which are capable of delivering graphene's unique properties, particularly for mass scale production of such electronic devices.

The inventors developed the present invention with the aim of overcoming the problems in the prior art and provide improved electro-optic modulators and associated methods of manufacture, or to at least provide commercially useful alternatives.

According to a first aspect, the present invention provides an electro-optic modulator comprising:

a substrate having a first channel of waveguide material embedded therein, the substrate and the waveguide material together providing a substantially flat upper surface, a first insulative layer on and across the upper surface;

a graphene layer arranged on the first insulative layer and over at least a first portion of the first channel of waveguide material; and a second insulative layer provided on and across the graphene layer;

wherein the graphene layer provides a first electrode, and wherein a, preferably non-graphene, second electrode is either:

(i) provided on the second insulative layer at least overlapping the first portion of the first channel of waveguide material, or (ii) provided within the substrate at least underlapping the first portion of the first channel of waveguide material.

The present disclosure will now be described further. In the following passages, different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

Known graphene-based electro-optic modulators comprise either a single layer of graphene as an electrode or a double layer graphene sandwiched by an insulator layer, amongst other more unusual configurations. Graphene in these modulators is provided by known mechanical transfer processes. The present inventors have developed the present electro-optic modulator comprising graphene obtainable by CVD which does not suffer the drawbacks associated with transferred graphene (such as copper and polymer contamination together with physical damage such as tearing and wrinkling).

The present inventors have sought to introduce high quality graphene directly by CVD but discovered problems associated with such a method. Accordingly, unlike the prior art, the present inventors have identified that an electro-optic modulator comprising a non-graphene second electrode provides an advantageous technical advantage in combination with CVD graphene. CVD graphene can provide reduced contact and sheet resistance reducing the energy consumption. The reduced impurities can simultaneously give rise to improved carrier mobility which increases the modulation speed of the device.

The electro-optic modulator of the present invention comprises a substrate having a first channel of waveguide material embedded therein. The substrate having an embedded waveguide material may be any substrate comprising a waveguide as is known in the art. By "embedded" it is meant that the waveguide material forms part of the body of the substrate and forms part of a substantially flat upper surface, a conventional term in the art in contrast with raised waveguides. In the art, the surrounding medium of the substrate may be referred to as the "cladding" and which is used to confine the light in the waveguide. Waveguides and waveguide materials are well known in the art and form the basic element of many integrated optical devices. A waveguide is typically in the form of a channel with dimensions sufficient to confine light in two dimensions. Accordingly, a cross section perpendicular to the third dimension (i.e. the direction of light travel) of an embedded waveguide is typically substantially rectangular though it will be appreciated that the waveguide channel may take any other shape known in the art and/or be part of a larger structure (such as a circular ring resonator in which case the direction of light travel may be taken as a tangent). Similarly, the waveguide may branch or channels may cross and have curved or bent structures and can be considered as nanophotonic wires. Waveguides can be branched for beam splitting and crossed for intersecting.

Preferably, the width to height ratio of the waveguide material is from 1.5:1 to 10:1. Preferably, the cross sectional height of the embedded waveguide material (a dimension which is substantially perpendicular to the graphene layer) is at least 100 nm, preferably at least 200 nm. The height may be less than 500 nm, preferably less than 400 nm such as from 100 nm to 500 nm, preferably from 200 nm to 400 nm. The width (a dimension which is substantially parallel to the graphene layer and perpendicular to the direction of light travel) may be at least 150 nm, preferably at least 300 nm, preferably at least 500 nm. The width may be at less than 1500 nm, preferably less than 1200 nm. Silicon nitride is a preferable waveguide material as described herein which generally has a lower scattering loss compared to other waveguide materials and may preferably therefore be wider. The width to height ratio for a silicon nitride waveguide may preferably be from 3:1 to 10:1, whereas the ratio for a silicon waveguide may preferably be from 1.5:1 to 5:1.

As will be appreciated, the waveguide material will have a higher refractive index than the substrate material within which it is embedded. A common substrate preferable for use in the EOM of the present invention is a silicon dioxide substrate. The silicon dioxide may form an upper layer on a bulk silicon substrate, the waveguide material being embedded within the silicon dioxide. Preferably, the substrate may be a CMOS wafer which may have associated circuitry embedded within the substrate. Accordingly, the substrate of the present EOM may comprise either of a silicon wafer or CMOS wafer. In other embodiments, the substrate may comprise III/V a semiconductor.

Preferably the waveguide material is silicon nitride, unintentionally doped silicon or n-doped silicon. As used herein, silicon nitride equally refers to $SiN_x$ which is well-known in the art and includes the idealised stoichiometric ratio wherein x is 1.33 (i.e. $Si_3N_4$). Silicon rich layers wherein x is as low as 0.5 are still known in the art as silicon nitride. Unintentionally doped silicon is intended to refer to substantially undoped silicon though the silicon may have unavoidable or minimal doping. The intrinsic charge carrier density of silicon is usually around $10^{10}$ $cm^{-3}$ and doped silicon typically has a charge carrier density of about $10^{13}$ $cm^{-3}$ or more and/or about $10^{20}$ $cm^{-3}$ or less, about $5\times10^{19}$ $cm^{-3}$ or less, or about $10^{19}$ $cm^{-3}$ or less. N-type doping elements are typically selected from phosphorus, arsenic, antimony, bismuth and lithium though other elements includes germanium, nitrogen, gold and platinum. Unintentionally doped silicon may therefore be considered to range from about $10^{10}$ $cm^{-3}$ to about $10^{13}$ $cm^{-3}$, preferably about $10^{10}$ to about $10^{12}$ $cm^{-3}$.

Other suitable waveguide materials are known in the art and include materials such as lithium niobate ($LiNbO_3$) and lithium tantalate ($LiTaO_3$) along with potassium titanyl arsenate (KTA: $KTiOAsO_4$) and potassium titanyl phosphate (KTP: $KTiOPO_4$) which fall generally under the formula $MTiOXO_4$ where M is an alkali metal or ammonia and X is phosphorus and/or arsenic. Equally, the substrate (as the cladding) may be formed of any appropriate lower refractive index material which includes the aforementioned materials which have been appropriately doped, such as with MgO or ZnO. Alternatively, the substrate (the cladding) may be MgO or ZnO, or $SiO_2$ as discussed above. Equally, the substrate may comprise further underlying layers such as silicon upon which the waveguide and cladding are provided. Other common waveguide materials include III-V semiconductors such as those comprising indium arsenide and/or gallium phosphide such as InGaAsP and AlInGaAs. Germanium is also a suitable waveguide material.

The EOM comprises a first insulative layer on and across the substantially flat upper surface of the waveguide embedded substrate. As described herein, "on" means directly on such that the first insulative layer of the EOM is in direct contact with the upper surface of the substrate and waveguide material. The substantially flat upper surface preferably has an arithmetic surface roughness (Ra) of less than 2 nm, preferably less than 1 nm, more preferably less than 0.5 nm and even more preferably less than 0.25 nm. Such a smooth surface allows high quality graphene to be formed by CVD directly thereon which is itself then substantially flat. The inventors have found that wrinkles and other defects in the graphene layer result in degradation of the electronic and optical properties of the graphene, for example through charge scattering. The inventors have found that charge scattering negatively impacts the device performance such as modulation efficiency and the extinction ratio and an improved device is therefore obtained by providing graphene directly on the first insulative layer by CVD.

The insulative layer is electrically insulating. Such materials are well known in the art and preferably have a conductivity as measured at room temperature (22° C.) of less than $10^{-5}$ S/cm, preferably less than $10^{-6}$ S/cm. Alternatively, this may be measured with respect to the materials band gap; silicon has a band gap of about 1.1 eV to about 1.6 eV whereas that of an insulator is much greater, typically greater than 3 eV, preferably greater than 4 eV.

The thickness of the first insulative layer is preferably from about 1 nm to about 100 nm, preferably from about 2 nm to about 50 nm, more preferably from about 3 nm to about 50 nm and even more preferably from about 5 nm to about 30 nm. Thicker layers are less preferred due to the impact on modulation efficiency. Whilst the first insulative layer may preferably be as thin as possible in order to improve the "gating efficiency" (i.e. the sensitivity of the Fermi energy of the graphene to the applied bias voltage), a thin insulative layer also increases capacitance which results in a reduction in bandwidth. Accordingly, the first insulative layer may have a high dielectric constant to improve the gating efficiency (i.e. comprise or preferably consist of so-called "high-k dielectrics" such as the materials described herein). The dielectric constant (k) of the insulative layer may be greater than 2, preferably greater than 3 and even more preferably greater than 4 (when measured at 1 kHz at room temperature). The dielectric constant may be much larger such as greater than 10. For example, k may be about 16.

Preferably, the first insulative layer comprises more than one layer of different insulative materials. Accordingly, suitable insulative material may be formed on the upper surface of the substrate and waveguide whilst preferred materials for graphene growth may be formed thereon. Accordingly, in a particularly preferred embodiment, the first insulative layer comprises a silicon oxide or silicon nitride layer on the upper surface of the substrate and waveguide, preferably silicon nitride. As described herein, $SiN_x$ may be formed by low pressure chemical vapour deposition (LPCVD). In some preferred embodiments, the embedded waveguide is also silicon nitride.

It is also preferred that the first insulative layer comprises or consists of a metal oxide layer. The layer may be one or more of any of the metal oxides $Al_2O_3$, $HfO_2$, MgO, $MgAl_2O_4$, ZnO, $Ga_2O_3$, $TiO_2$, $SrTiO_3$, $LaAlO_3$, $Ta_2O_5$, $LiNbO_3$, $Y_2O_3$, Y-stabilised $ZrO_2$ (YSZ), $ZrO_2$, $Y_3Al_5O_{12}$ (YAG). Even more preferably, the first insulative layer comprises an oxide of one or more of aluminium, hafnium and magnesium, preferably aluminium oxide or hafnium oxide.

Preferably, the metal oxide layer is provided on the silicon oxide or silicon nitride layer as described above to form an insulative layer comprising more than one layer. The metal oxide layer provides an upper surface upon which graphene is then provided, preferably grown by CVD as described herein. The inventors found that the waveguide structure remains intact after graphene growth at the relatively high temperatures required for CVD with the waveguide retaining its sharp/smooth interfaces. Accordingly, the EOM of the present invention requires a flat surface upon which graphene may be provided to extend over and above the waveguide material (in contrast to ridge waveguides in the art wherein transferred graphene may be folded over the sides of the protruding ridge of waveguide material). The substantially flat graphene obtainable by CVD is of particularly high quality such that the advantageous benefits associated with the two-material may be retained in the final device. In particular, the two-dimensional material is a semi-metal whose density of states at the Fermi level is substantially zero as a result of its electronic structure taking the form of two cones meeting at the so-called Dirac point. In the vicinity of the Dirac point, charge carriers may be modelled as massless fermions and in pristine graphene, electrons can be excited by incident photons with a broad range of energies where only interband transitions are allowed. Transmittance of pristine graphene is substantially frequency independent resulting in a constant absorption of about 2.3% per single monolayer. Accordingly, the device of the present invention can operate across a broad spectrum of wavelengths preferably operating from visible to mid-IR wavelengths as is customary in the art.

Preferably, the device is for modulation of light of at least 300 nm up to 8000 nm, preferably from 500 nm up to 4000 nm, preferably from 1000 nm to 2000 nm at most preferably from 1250 nm to 1600 nm. In one embodiment, telecommunications wavelengths of from 1500 nm to 1600 nm are preferred. This range of about 1550 nm is the so-called "long wavelength" for fibre optic transmission which is typically used for higher speed and higher bandwidth applications. So-called "short wavelength" transmission ranges are preferably from 800 to 900 nm (i.e. about 850 nm and typically multi-mode optical fibers) along with from 1250 nm to 1350 nm (i.e. about 1300 nm) in other preferred embodiments. Typically, single-mode fibers are used in telecommunications which operate at the higher wavelengths of 1300 nm and 1550 nm.

As will be appreciated, a waveguide material of appropriate transparency need be selected for operation at the desired wavelengths. By way of example, silicon is transparent to light above about 1.1 μm up to about 8 μm. Lithium niobate is transparent from about 250 nm to about 4 μm and silicon nitride from about 250 nm to about 8 μm. Accordingly, it is preferred that the waveguide material is transparent to light across the range of 1250 nm to 1600 nm and as discussed above, $SiN_x$, n-doped silicon or unintentionally doped silicon are suitable preferred examples. The Fermi level of the graphene may be electrically tuned by application of a gate voltage. By tuning the Fermi level, the density of states available for interband transitions can be tuned. Accordingly, application of a gate voltage permits graphene to become substantially transparent and permit transmission of light as a result of so-called Pauli blocking. This occurs where the Fermi energy is increased above half of the photon energy thereby inhibiting carrier excitation from the valence to conduction band. The inventors have found that modulation can be improved with higher quality and more uniform graphene obtainable directly by CVD.

Accordingly, the electro-optic modulator comprises a graphene layer arranged on the first insulative layer and over at least a first portion of the first channel of waveguide material. The graphene layer may be patterned, such as by laser or plasma etching as is known in the art. The graphene is patterned such that at least a portion of the graphene layer extends directly over a first portion of the underlying waveguide. In other words, at least a portion of the waveguide channel sits in a position which is in a direction perpendicular to the two-dimensional graphene layer. The first portion refers to a fraction of the width of the waveguide channel. Preferably, the first portion is at least 50% of the width, preferably at least 75% of the width. Even more preferably, the graphene is arranged over at least the entire width of the waveguide channel. As will be appreciated, the graphene may extend over only a portion of the entire length of the waveguide channel embedded in the underlying substrate. In an embodiment, the graphene layer extends over multiple portions of the length of the waveguide channel providing a grated-type structure. The length of waveguide material over which the graphene extends (i.e. at least in any individual continuous portion and/or as a sum of multiple portions) may be at least 5 μm, preferably at least 10 μm, preferably at least 30 μm, more preferably at least 50 μm, even more preferably at least 100 μm and/or at most 1 cm, preferably at most 1 mm, more preferably at most 500 μm, even more preferably at most 250 μm. There is no specific upper limit since greater absorption is achieved with diminishing returns at greater lengths; it is generally preferred to have devices as small as possible. Accordingly, in some embodiments it is preferred that the length is at most 100 μm, preferably at most 75 μm, and more preferably at most 50 μm.

It is known in the art that graphene may be synthesised, manufactured, formed, directly on non-metallic surfaces of substrates. These include silicon and sapphire along with other more exotic surfaces such as III-V semiconductors. The present inventors have found that the most effective method for manufacturing high-quality graphene, especially directly on such non-metallic surfaces, is that disclosed in WO 2017/029470 and is described in greater detail herein. The method of WO 2017/029470 is ideally performed using an MOCVD reactor. Whilst MOCVD stands for metal organic chemical vapour deposition due to its origins for the purposes of manufacturing semiconductor materials such as AlN and GaN from metal organic precursors such as $AlMe_3$ (TMAl) and $GaMe_3$ (TMGa), such apparatus and reactors are well known and understood to those skilled in the art as being suitable for use with non-metal organic precursors. MOCVD may be used synonymously with metal organic vapour phase epitaxy (MOVPE).

Graphene is a very well-known two-dimensional material referring to an allotrope of carbon comprising a single layer of carbon atoms in a hexagonal lattice. Graphene and graphene layer, as used herein, refers to one or more layers of graphene. Preferably, the graphene layer is a graphene monolayer which may also be referred to as a monolayer graphene sheet. Nevertheless, multilayer graphene may be used in which case 2 or 3 layers of graphene may be preferred. In some embodiments, the graphene may be doped (n or p type) as is well known in the art. Methods for forming doped graphene are also described in WO 2017/029470. Doped graphene may preferably have a charge carrier density of up to $10^{13}$ $cm^{-2}$, preferably up to $5\times10^{12}$ $cm^{-2}$.

The EOM further comprises a second insulative layer provided on and across the graphene layer. Where the graphene may have been patterned thereby exposing the first insulative layer, the second insulative layer is also on the exposed portions of the first insulative layer thereby substantially encapsulating the graphene layer by insulator material. This protects the graphene layer from atmospheric contamination with would otherwise result in an undesirable drift in the charge carrier density and Fermi level of the graphene layer. Accordingly, the operation of the EOM is negatively affected by such atmospheric contamination. As described herein, one or more portions may be etched or otherwise removed in order to allow for the formation of ohmic contacts to the graphene layer.

The materials described herein for the first insulative layer may equally be used for the second insulative layer. Similarly, the thickness is as described for the first insulative layer and preferably less than 100 nm. This allows for sensitive bias tuning of the Fermi level of the graphene. Preferably, the second insulative layer comprises, preferably consists of, an oxide of one or more of aluminium, hafnium and magnesium. Preferably the oxide is aluminium oxide or hafnium oxide. It is also preferred that the second insulative layer is formed of the same material as the upper layer of the first insulative layer. As described herein, such a layer may be formed by a method such as ALD which is particularly suitable for growing directly on graphene without undesirably doping or damaging of the graphene layer and in some embodiments, serves to provide a further substantially flat upper surface upon which a non-graphene electrode may be provided.

The graphene layer provides a first electrode for the electro-optic modulator. That is to say, when the electro-optic modulator is connected into a circuit, and when in use, an electrical current may be applied to the graphene layer. Electrical contacts, such as ohmic contacts as is known in the art may be used to contact the graphene layer for connection into an electronic circuit.

The electro-optic modulator further comprises a second electrode which is preferably a non-graphene electrode. While the second electrode is discussed herein as a non-graphene electrode, in a less-preferred embodiment it should be appreciated that in all instances the electrode could instead be a graphene electrode.

As with the first graphene electrode, the non-graphene second electrode may also be provided with contacts, such as ohmic contacts, in order to allow connection to an electronic circuit. Preferably, the second electrode is provided by a method which does not involve heating an intermediate of the electro-optic modulator comprising the first graphene electrode to a temperature greater than 500° C., preferably by a method which does not involve heating to a temperature greater than 400° C., preferably no greater than 300° C., preferably no greater than 200° C., preferably no greater than 100° C. and even more preferably substantially without any heating (i.e. no specific heating of the intermediate though it will be appreciated that the temperature may fluctuate during deposition of the second electrode depending on the method employed). Accordingly, it is preferred that the second electrode is not provided (or formed, or deposited) by chemical vapour deposition (CVD) methods. Preferably, the second electrode is provided by physical vapour deposition (PVD).

In one embodiment, the non-graphene second electrode is provided on the second insulative layer over at least a portion of the first portion of the first channel of waveguide material. In other words, the second electrode at least overlaps the first portion so as to extend over at least a part of the first portion (wherein the first portion is preferably the entire width of the waveguide channel as described herein). Equally, the second electrode preferably is arranged over at least the entire width of the waveguide channel (thereby lying over the entirety of the first portion). The second insulative layer provides a substantially flat surface upon which the second electrode may be provided. The second electrode is provided over at least the first portion of the first channel of waveguide material and therefore over the corresponding portion of the graphene electrode. The two electrodes therefore form a capacitor-type arrangement.

Where the second electrode is provided above the graphene layer, the electrode may be within the optical mode of the waveguide material. In such case, it is particularly preferred that the second electrode is a transparent electrode. Suitable materials are well known in the art, of which indium tin oxide (ITO), indium gallium zinc oxide (InGaZnO; also known as IGZO) and amorphous silicon are preferred. Accordingly, the second electrode preferably comprises ITO, IGZO, or amorphous silicon.

In another embodiment, the second electrode is provided within the substrate at least underlapping the first portion of the first channel of waveguide material. In other words, the second electrode at least underlaps the first portion so as to extend under at least a part of the first portion (wherein the first portion is preferably the entire width of the waveguide channel as described herein). Equally, the second electrode preferably is arranged under at least the entire width of the waveguide channel (thereby lying under the entirety of the first portion). Preferably, the second electrode is integrally formed within the substrate with the first channel of waveguide material. Accordingly, the first channel of waveguide material may in some embodiments itself act as a second electrode. As a result, the waveguide material is electrically conductive. Preferably, the electrical conductivity is at least $10^{-2}$ S/cm ($\Omega^{-1}$ $cm^{-1}$), preferably at least $10^{-1}$ S/cm, more preferably at least $10^{0}$ S/cm. Preferably, when the second electrode is provided within the substrate, the second electrode comprises n-doped silicon. Preferably, the carrier concentration is at least $10^{12}$ $cm^{-3}$, preferably at least $10^{13}$ $cm^{-3}$. Typically, doping of silicon is no greater than about $10^{19}$ $cm^{-3}$. N-doped silicon is particularly preferred as an electrically conductive material suitable as a waveguide material. As will be appreciated, the second electrode comprises further channels of, for example n-doped silicon, embedded within the substrate and extending to an exposed surface of the substrate for connection to an electronic circuit. Such embedded electrodes (including those integrally formed with the waveguide material) are well known in the art. In some embodiments, the waveguide material is a lightly n-doped silicon (e.g. at least $10^{12}$ $cm^{-3}$ up to $10^{14}$ $cm^{-3}$) and the connecting channel of the second electrode is a heavily n-doped silicon (e.g. at least $10^{14}$ $cm^{-3}$ up to $10^{19}$ $cm^{-3}$) for improved conduction without effecting the refractive index of the waveguide material.

As described herein, preferred embodiments of the electro-optic modulator comprise a first insulative layer that comprises an oxide of one or more of aluminium, hafnium and magnesium, preferably aluminium oxide or hafnium oxide. Furthermore, the first insulative layer preferably further comprises a silicon nitride layer directly on the upper surface of the substrate whereby the insulative layer comprises the oxide on the silicon nitride layer.

In some specific embodiments of the present invention, it is preferred that the waveguide material comprises $SiN_x$, the second electrode is provided on the second insulative layer, and the second electrode comprises ITO, InGaZnO or amorphous silicon.

In another preferred specific embodiment, the waveguide material comprises unintentionally doped silicon, the second electrode is provided on the second insulative layer, and the second electrode comprises ITO, InGaZnO or amorphous silicon.

In a further preferred specific embodiment, the second electrode is provided within the substrate and the second electrode and the waveguide material are integrally formed from n-doped silicon.

In a preferred embodiment, the electro-optic modulator further comprises a second channel of waveguide material parallel to and aligned over the first channel of waveguide material. The alignment of the second channel over the first channel enables modulation of light by the single graphene layer. Preferably, the cross sectional dimensions of the second waveguide are substantially the same as the first waveguide.

Where the second electrode is embedded within the substrate, the second channel of waveguide material is preferably provided on the second insulative layer. Alternatively, in embodiments wherein the second electrode is provided on the second insulative layer, the second channel of waveguide material may preferably be provided on the second electrode. As will be appreciated, the second channel extends parallel to the first channel of waveguide material and beyond the "active region" comprising the graphene and non-graphene electrodes. Accordingly, the second channel is also provided on the second insulative layer in portions wherein the first channel of waveguide material is not directly under a graphene layer and/or, in particular, the second electrode.

Alternatively, it is also preferred that the electro-optic modulator further comprises a third insulative layer (such as an oxide as described herein) which is provided on the second insulative layer and the second electrode when the second electrode is provided on the second insulative layer. Preferably, the second and third insulative layers consist of the same material. The second channel of waveguide material may then be provided on the third insulative layer and over the first channel of waveguide material, the first portion of the graphene layer and the second electrode. By including a third insulative layer across the intermediate before forming the second waveguide, a more uniform waveguide may be formed as a result of depositing the channel across a single material surface of the third insulative layer. Furthermore, the third insulative layer acts to protect the second electrode during the formation of the second waveguide.

As described herein, the EOM may further comprise contacts to enable connection of the first and second electrodes to a circuit. Preferably, the contacts are ohmic contacts and are each provided in contact with the first or second electrode. This may be achieved by etching the appropriate insulative layer to expose the electrode. In some embodiments, a portion of the appropriate insulative layer and a corresponding portion of the underlying electrode may be etched simultaneously exposing an edge of the electrode. Accordingly, it is preferred that an ohmic contact is provided in contact with an edge of the electrode, preferably the graphene layer. By providing an ohmic contact at the edge of the graphene layer, unintentional doping of the graphene layer can be avoided by minimising the contact area between graphene and the ohmic contact. Furthermore, the inventors have found that charge injection is more efficient at the graphene edge when compared to ohmic contacts provided on a surface of the graphene.

Ohmic contacts are typically provided at a distance from the waveguide sufficient not to affect the propagation of light. In some embodiments, the contacts are provided at least 300 nm away from the waveguide, preferably at least 500 nm. Preferably, the ohmic contacts are metal contacts, preferably selected from one or more of titanium, nickel, chromium, platinum, palladium and aluminium. Particularly preferred contacts are Ti/Al and Ni/Al. Preferably, the contacts do not comprise gold.

A further aspect of the present invention provides a circuit comprising the electro-optic modulator according to any preceding claim. Accordingly, the first and second electrodes will provide the connectivity of the device to the rest of the circuit. As will be appreciated, as an electro-optic modulator, when in use, a source of light directs light into the channel of waveguide material. The source of light may be, for example, an optical fiber, typically silica (silicon dioxide).

Further aspects of the present invention provide various methods of forming various specific embodiments of the electro-optic modulator of the first aspect, and specifically electro-optic modulators wherein the first insulative layer further comprises a silicon nitride layer directly on the upper surface provided by the substrate and embedded waveguide material.

Accordingly, one method of the present invention of forming an electro-optic modulator, specifically one wherein the waveguide material comprises $SiN_x$, the second electrode is provided on the second insulative layer, and the second electrode comprises ITO, InGaZnO or amorphous silicon, the method comprises:

- providing a substrate having a first channel etched therein,
- filing the first channel with $SiN_x$ and forming a layer of $SiN_x$ across the substrate by low pressure CVD;
- at least partially etching the $SiN_x$ layer to form a substantially flat growth surface;
- depositing an oxide of one or more of aluminium, hafnium and magnesium on the growth surface to form the first insulative layer;
- forming a graphene monolayer across the first insulative layer by CVD;
- etching the graphene monolayer to form the first electrode;
- depositing an oxide of one or more of aluminium, hafnium and magnesium, to form the second insulative layer; and
- providing the second electrode on the second insulative layer.

A further method of forming an electro-optic modulator, specifically one wherein the waveguide material comprises unintentionally doped silicon, the second electrode is provided on the second insulative layer, and the second electrode comprises ITO, InGaZnO or amorphous silicon, comprises:

- providing a substrate having a first channel etched therein,
- filing the first channel with unintentionally doped silicon;
- forming a layer of $SiN_x$ across the substrate and the first channel by low pressure CVD;
- partially etching the $SiN_x$ layer to form a substantially flat growth surface;
- depositing an oxide of one or more of aluminium, hafnium and magnesium, on the growth surface to form the first insulative layer;
- forming a graphene monolayer across the first insulative layer by CVD;
- etching the graphene monolayer to form the first electrode;
- depositing an oxide of one or more of aluminium, hafnium and magnesium, to form the second insulative layer; and
- providing the second electrode on the second insulative layer.

In yet a further method of forming an electro-optic modulator, specifically one wherein the second electrode is provided within the substrate and the second electrode and the waveguide material are integrally formed from n-doped silicon, the method comprises:

- providing a substrate having an n-doped silicon channel embedded therein, when the channel further comprises the second electrode integrally formed from n-doped silicon extending through the substrate,
- forming a layer of $SiN_x$ across the substrate and the first channel by low pressure CVD;
- partially etching the $SiN_x$ layer to form a substantially flat growth surface;
- depositing an oxide of one or more of aluminium, hafnium and magnesium, on the growth surface to form the first insulative layer;
- forming a graphene monolayer across the first insulative layer by CVD;
- etching the graphene monolayer to form the first electrode;
- depositing an oxide of one or more of aluminium, hafnium and magnesium, to form the second insulative layer.

In each of the method aspects described above, the second electrode could, alternatively, be provided as a graphene electrode. Methods for making such electrodes are discussed herein in relation to the first electrode (i.e. the graphene monolayer). The second electrode in these embodiments would also preferably be a monolayer.

Thus, in one aspect of forming an EOM, the method comprises providing a substrate having a channel etched therein. This may be achieved by, for example, laser, plasma and/or reactive ion etching a suitable substrate (such as a silicon dioxide on silicon substrate) to etch a channel into the surface of the substrate. Such etching techniques are well known in the art.

A suitable waveguide material is deposited within the etched channel of the desired dimensions so as to form the first channel of waveguide material. In one preferred embodiment, the waveguide material is silicon nitride and the silicon nitride is deposited into the etched channel by low pressure chemical vapour deposition (LPCVD). LPCVD is particularly preferred for achieving low-loss substantially $SiN_x$ and is typically carried out at deposition of temperatures of around 650° C. to 900° C. Typically, the residual hydrogen contact in PECVD grown silicon nitride is much higher resulting in larger optical absorption, particularly at telecoms wavelengths. Additionally, PECVD grown silicon nitride typically has a higher pinhole density.

Silicon nitride is deposited so as to fill the etched channel for the waveguide and further, deposition is continued to provide a layer of silicon nitride across the waveguide channel and the remainder of the substrate. The method further comprises partially etching the silicon nitride layer so as to provide a substantially flat growth surface (i.e. a flat surface upon which an insulative oxide may be deposited).

Preferably, the partial etching of the silicon nitride layer is carried out by chemical mechanical polishing (CMP) or planarization. Preferably, the surface roughness of the silicon nitride layer, as measured by its arithmetic average (Ra), is less than 2 nm, preferably less than 1 nm, more preferably less than 0.5 nm, even more preferably less than 0.25 nm. Ra is preferably measured by atomic force microscopy (AFM). The inventors have found that growth of silicon nitride by LPCVD followed by partial etching advantageously provides a suitably smooth and uniform growth surface of silicon nitride upon which a uniform insulative oxide layer may be provided. The inventors have found that particularly high quality graphene may be grown by CVD directly onto an insulative oxide that itself has a smooth upper surface, particularly an oxide of one or more of aluminium, hafnium and magnesium, thereby enabling the construction of an EOM which may benefit from graphene's unique electro-optic properties.

The methods involve a step of depositing an oxide of one or more of aluminium, hafnium and magnesium onto the surface of the etched silicon nitride layer, i.e. the growth surface so as to form the first insulative layer. Such a step may be carried out using any technique known in the art.

E-beam deposition, PECVD, PEALD and ALD are preferable techniques. Atomic layer deposition in particular is preferred since the inventors have found that the oxide layer remains highly uniform when grown by ALD permitting the formation of highly uniform graphene thereon by CVD.

The methods further comprise the step of forming a graphene monolayer across the first insulative layer by CVD. The graphene being formed directly on the first insulative layer means that the graphene is devoid of any copper, or other catalytic metal, contamination or any transfer polymer residues which are inevitable in prior art processes based on transferred graphene.

Preferably, the graphene is grown by CVD in accordance with the disclosure of WO 2017/029470 (the contents of which is incorporated herein by reference). This publication discloses methods for manufacturing graphene; principally these rely on heating a substrate held within a reaction chamber to a temperature that is within a decomposition range of a carbon based precursor for graphene growth, introducing the precursor into the reaction chamber through a relatively cool inlet so as to establish a sufficiently steep thermal gradient that extends away from the substrate surface towards the point at which the precursor enters the reactions chamber such that the fraction of precursor that reacts in the gas phase is low enough to allow the formation of graphene from carbon released from the decomposed precursor. Preferably the apparatus comprises a showerhead having a plurality of precursor entry points or inlets, the separation of which from the substrate surface may be varied and is preferably less than 100 mm.

Growing graphene is synonymous with synthesising, manufacturing, producing and forming graphene. The methods comprise forming a graphene monolayer by CVD which will take place in a CVD reaction chamber. This step of forming graphene will typically comprise introducing a precursor in a gas phase and/or suspended in a gas into the CVD reaction chamber. CVD refers generally to a range of chemical vapour deposition techniques, each of which involve vacuum deposition to produce thin film materials such as two-dimensional crystalline materials like graphene. Volatile precursors, those in the gas phase or suspended in a gas, are decomposed to liberate the necessary species to form the desired material, carbon in the case of graphene. Preferably, the method involves forming graphene by thermal CVD such that decomposition is a result of heating the precursor. Preferably, the CVD reaction chamber used is a cold-walled reaction chamber wherein a heater coupled to the substrate is the only source of heat to the chamber.

In a particularly preferred embodiment, the CVD reaction chamber comprises a close-coupled showerhead having a plurality, or an array, of precursor entry points. Such CVD apparatus comprising a close-coupled showerhead may be known for use in MOCVD processes. Accordingly, the method may alternatively be said to be performed by MOCVD and/or using an MOCVD reactor comprising a close-coupled showerhead. In either case, the showerhead is preferably configured to provide a minimum separation of less than 100 mm, more preferably less than 25 mm, even more preferably less than 10 mm, between the surface of the first insulative layer and the plurality of precursor entry points. As will be appreciated, by a constant separation it is meant that the minimum separation between the surface of the first insulative layer and each precursor entry point is substantially the same. The minimum separation refers to the smallest separation between a precursor entry point and the surface of the first insulative layer. Accordingly, such an embodiment involves a "vertical" arrangement whereby the plane containing the precursor entry points is substantially parallel to the plane of the surface.

The precursor entry points into the reaction chamber are preferably cooled. The inlets, or when used, the showerhead, are preferably actively cooled by an external coolant, for example water, so as to maintain a relatively cool temperature of the precursor entry points such that the temperature of the precursor as it passes through the plurality of precursor entry points and into the reaction chamber is less than 100° C., preferably less than 50° C.

Preferably, a combination of a sufficiently small separation between the surface and the plurality of precursor entry points and the cooling of the precursor entry points, coupled with the heating of the substrate to within a decomposition range of the precursor, generally in excess of 700° C., generates a sufficiently steep thermal gradient extending from the substrate surface to the precursor entry points to allow graphene formation on the substrate surface. As disclosed in WO 2017/029470, very steep thermal gradients may be used to facilitate the formation of high-quality and uniform graphene directly on non-metallic substrates, preferably across the entire surface of the substrate. The substrate may have a diameter of at least 5 cm (2 inches), at least 15 cm (6 inches) or at least 30 cm (12 inches). Particularly suitable apparatus for the method described herein include an Aixtron® Close-Coupled Showerhead® reactor and a Veeco® TurboDisk reactor.

Consequently, in a particularly preferred embodiment wherein the formation of graphene involves using a method as disclosed in WO 2017/029470, the formation of graphene comprises:

providing the substrate having the layer $SiN_x$ and first insulative layer on a heated susceptor in a close-coupled reaction chamber, the close-coupled reaction chamber having a plurality of cooled inlets arranged so that, in use, the inlets are distributed across the surface of the first insulative layer and have constant separation from the surface of the first insulative layer;

cooling the inlets to less than 100° C.;

introducing a precursor in a gas phase and/or suspended in a gas through the inlets and into the CVD reaction chamber to thereby decompose the precursor and form graphene on the surface of the first insulative layer; and heating the susceptor to a temperature of at least 50° C. in excess of a decomposition temperature of the precursor, to provide a thermal gradient between the surface of the first insulative layer and inlets that is sufficiently steep to allow the formation of graphene from carbon released from the decomposed precursor;

wherein the constant separation is less than 100 mm, preferably less than 25 mm, even more preferably less than 10 mm.

The methods further comprise the steps of etching the graphene monolayer to form the first electrode and a second step of depositing an oxide of one or more of aluminium, hafnium and magnesium so as to form the second insulative layer.

The step of etching the graphene permits patterning the graphene into a desired shape and configuration. In one embodiment, the second insulative layer is deposited on the graphene monolayer before the step of etching the graphene. Accordingly, such an embodiment, the step of etching the graphene monolayer simultaneously comprises etching portions of the second insulative layer deposited thereon. Such an embodiment is particularly preferable since the graphene remains protected from contamination by the second insulative layer. Additionally, by etching and patterning the graphene simultaneously with the second insulative layer, only the edges of the graphene are exposed. As a result, contacts such a metal ohmic contacts may be deposited so as to contact only a portion of the edge of the etched graphene monolayer.

Various methods further comprise providing the transparent second electrode on the second insulative layer, the electrode comprising ITO, IGZO or amorphous silicon. Such an electrode may be form by any technique known in the art. Such electrodes are well known transparent electrodes.

Whilst prior electro-optic modulators comprising graphene utilise graphene as both first and second electrodes, the present inventors have found that under the conditions necessary to grow graphene by CVD, by providing a second graphene electrode by CVD the first graphene layer is undesirably doped by the insulative oxide layers and the process risks damaging the EOM structure. Nevertheless, the first graphene layer having been grown by CVD directly onto the first insulative layer affords many benefits over graphene which has been transferred. Such graphene is lower in quality and cannot deliver graphene's unique electronic properties as a result of the unavoidable damage and doping which occurs during the transfer processes. Typically, graphene grown by CVD on copper foil remains unintentionally and unavoidably doped with copper atoms. Furthermore, in order to remove the graphene from the copper foil, the graphene is exposed to various solvents and etching solutions with further contaminate the graphene and polymer coating used to support the graphene during the process is often never fully removed from the graphene surface. Finally, the physical transfer of graphene results in the formation of cracks, wrinkles and other deformations which are not present when graphene is grown directly onto the substrate of the device. Accordingly, the inventors have sought to maintain the desirable electronic properties of the first graphene layer by avoiding further steps which may otherwise unintentionally dope the graphene. As a result, the performance of the graphene-based EOM is improved.

Preferably, the method further comprises forming ohmic contacts so as to contact each of the first and second electrodes (i.e. the graphene and non-graphene electrodes). Such contacts may be formed by e-beam deposition of suitable metals such as titanium, nickel and/or aluminium.

In another preferred method, a substrate is first provided having an n-doped silicon channel embedded therein and integrally formed with the waveguide enabling the channel of waveguide material to operate as the second electrode. Such embedded channel are well known in the art and can be prepared using standard photolithography techniques. The channel is preferably provided so as to extend to the upper surface of the substrate so that an electrical connection can be made. In alternative embodiments, the substrate may be etched to expose a portion of the channel and an ohmic contact deposited on the n-doped silicon.

The present disclosure also provides for an array of electro-optic modulators as described herein and which share a common substrate. Accordingly, the methods described herein permit the manufacture of a plurality of electro-optic modulators in a single process. Preferably, the array is manufactured on a substrate having a diameter of at least 5 cm (2 inches), at least 15 cm (6 inches) or at least 30 cm (12 inches). Such a method allows for the mass production and commercialisation of graphene-based electro-optic modulators. Prior EOMs rely on the transfer of graphene which is not suitable for scaled up production of a plurality of devices across such large substrates. Whilst transfer techniques have been used for wafer scale production, such as in *ACS Nano* 15, 3171-3187 (2021), a complex multi-stage transfer process is required in order to minimise the risks associated with graphene transfer in an effort to achieve reproducibility. Additionally, the transfer process involves the transfer of multiple tiles of about 2×2.5 cm comprising individual domains of graphene crystals. The present device provides high quality graphene directly on the surface of the device substrate thereby avoiding the risks associated with transfer processes and which may then be easily etched into a desired shape.

Accordingly, such a method permits the reproducible manufacture of a plurality of EOMs with uniform electronic performance.

In another aspect, the present invention provides an electro-optic modulator comprising: a substrate providing a substantially flat upper surface;

a first insulative layer on and across the upper surface;

a graphene layer arranged on the first insulative layer;

a second insulative layer provided on and across the graphene layer; and a first channel of waveguide material arranged on the second insulative layer and over at least a first portion of the graphene layer;

wherein the graphene layer provides a first electrode, and wherein a, preferably non-graphene, second electrode is either:

(i) the substrate, or (ii) provided within the substrate under at least the first portion of the graphene layer.

The electro-optic modulator of this further aspect may be regarded equivalent to the electro-optic modulator of the first aspect wherein a second waveguide material is arranged over the graphene layer (and the first channel of waveguide material) with the exception that the embedded waveguide is not present in the EOM of this further aspect. As a result, the non-graphene second electrode may simply be the substrate itself or may be embedded within the substrate in an equivalent manner as described herein in respect of the EOM of the first aspect. As will be appreciated, it is not essential that the embedded electrode be formed of suitable waveguide material and/or be embedded within suitable cladding so as to act as a waveguide.

Preferably, the non-graphene second electrode is silicon provided by either (i) by a silicon substrate, or (ii) by a portion of silicon within a substrate. As will be appreciated, the substrate will have a lower electrical conductivity than the electrode if provided within the substrate. Preferably, where the second electrode is provided within the substrate, the silicon is n-doped silicon within a silicon dioxide or silicon substrate, or the silicon is unintentionally doped silicon within a silicon dioxide substrate.

FIGURES

The present invention will now be described further with reference to the following non-limiting Figure, in which.

Figure 1A:
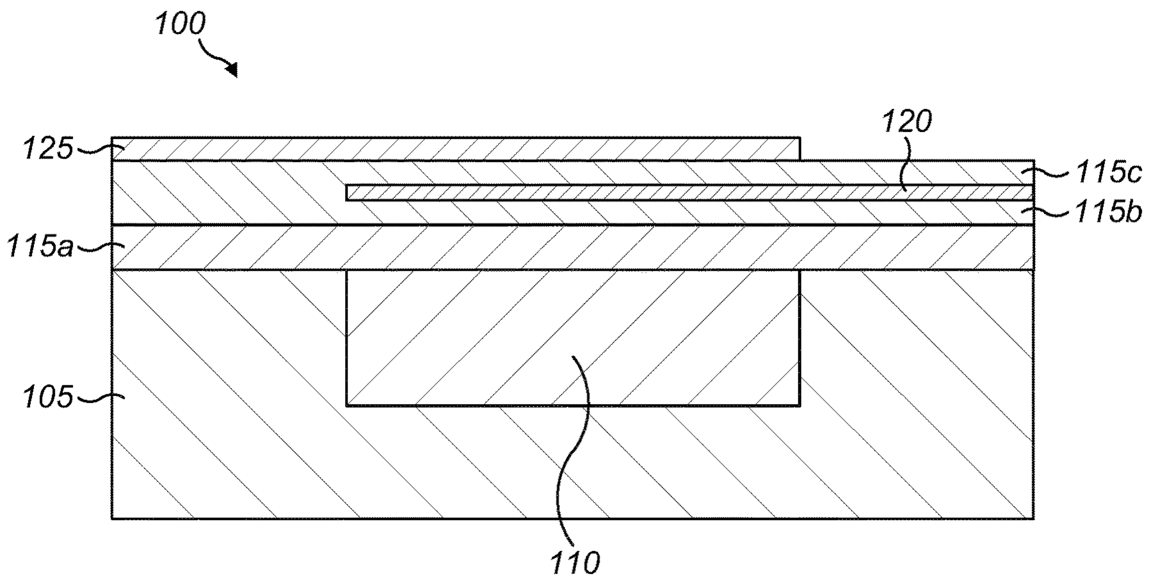
FIG. 1A is cross-sectional view of an electro-optic modulator according to the present invention.

FIG. 1A is a cross-sectional view of an EOM 100 perpendicular to the direction of light travel when the EOM 100 is in use. The modulator 100 comprises a substrate 105 having a channel of waveguide material 110 embedded therein such that the channel of waveguide material 110 and the substrate 105 together provide a substantially flat upper surface upon which a first insulative layer (115*a* and 115*b*) is provided. The channel of waveguide material is unintentionally doped silicon having a dopant concentration of about $10^{12}$ $cm^{-3}$. The waveguide 110 is substantially rectangular perpendicular to the direction of light travel and has a cross-sectional width of about 1200 nm and a height of about 250 nm.

The first insulative layer consists of a lower layer 115*a* and an upper layer 115*b*, the lower layer 115*a* being directly on the upper surface provided by the substrate 105 and waveguide 110. The lower layer 115*a* is formed of silicon nitride and has a thickness of about 15 nm. The first insulative layer comprises an upper layer 115*b* of aluminium oxide having a thickness of about 10 nm.

The modulator 100 further comprises a monolayer of graphene 120 arranged on the first insulative layer (115*a* and 115*b*), and specifically on the upper aluminium oxide layer 115*b*, and over the entire width of the channel of waveguide material 110. The monolayer of graphene 120 having been formed across the entire upper aluminium oxide layer 115*b* by CVD at a temperature in excess of 900° C., the graphene is patterned by laser etching so as leave a portion which extends over the waveguide 110. The thickness of the silicon nitride and aluminium oxide layers 115*a* and 115*b* are as measured between the waveguide 110 and graphene monolayer 120.

The modulator 100 further comprises a second insulative layer 115*c* formed of aluminium oxide which is provided on and across the graphene monolayer 120. Accordingly, in the regions wherein the graphene had been etched and removed (such as regions which are not over the waveguide 110), the aluminium oxide of the second insulative layer 115*c* is also formed on the upper layer 115*b* of the first insulative layer (115*a* and 115*b*) which is itself also formed aluminium oxide.

The graphene monolayer 120 provides a first electrode of the EOM 100 and a non-graphene second electrode 125 formed of indium tin oxide (ITO) is provided on the second insulative layer 115*c* and overlaps the entire portion of the graphene monolayer 120 which is arranged over the waveguide 110. Accordingly, the ITO electrode 125 also extends over the entire width of the waveguide 110.

Figure 1B:
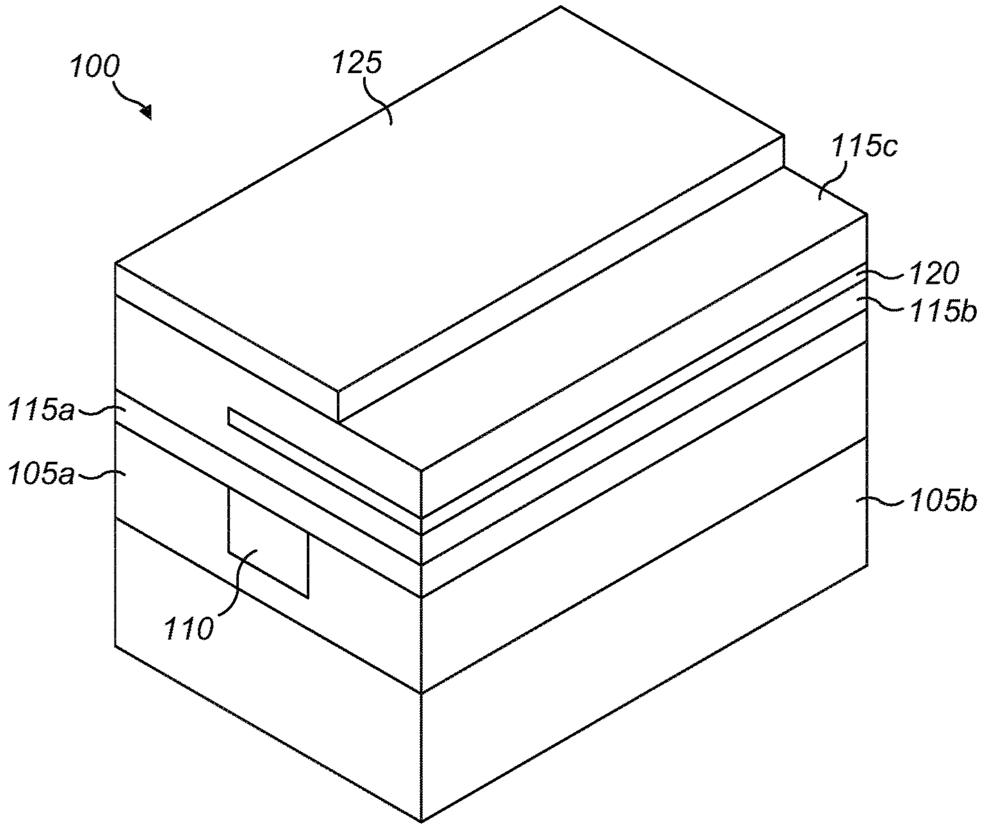
FIG. 1B is a perspective view of an equivalent electro-optic modulator.

FIG. 1B provides a perspective view of an equivalent electro-optic modulator 100. The substrate 105 of the modulator 100 is formed of an upper layer 105*a* and a lower layer 105*b*. The upper layer 105*a* may be referred to in the art as the cladding and is formed of silicon dioxide. The waveguide 110 is embedded within the silicon dioxide upper layer 105*a*. The substrate 105 further comprises a lower layer 105*b* formed of silicon.

Figure 2:
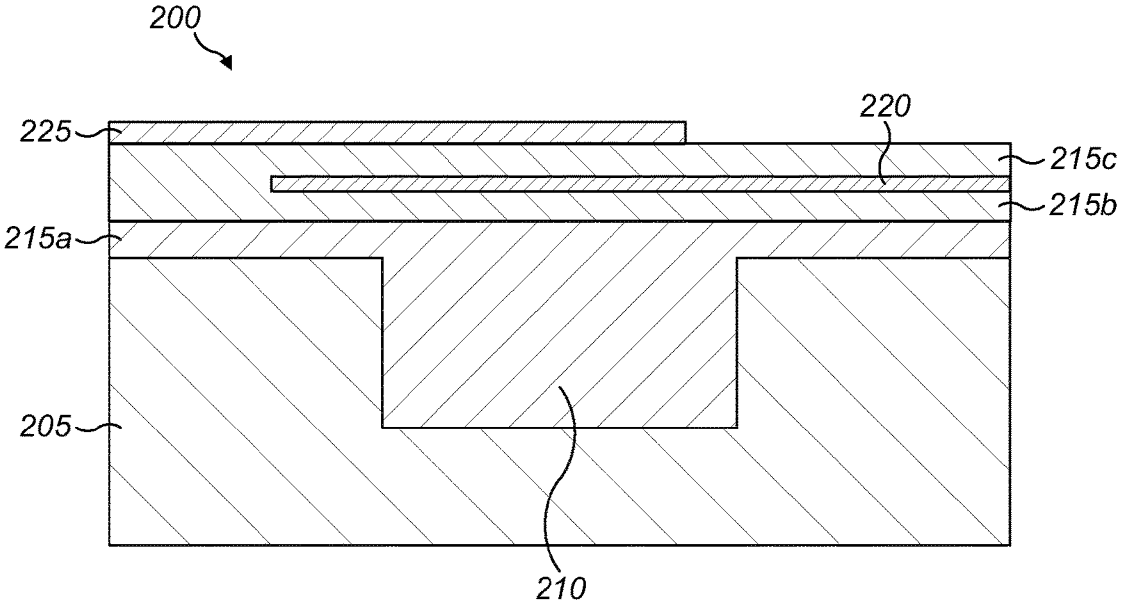
FIG. 2 is cross-sectional view of a further electro-optic modulator according to the present invention.

FIG. 2 provides a cross-sectional view of another electro-optic modulator 200 which comprises a silicon dioxide substrate 205 having a channel of silicon nitride 210 embedded therein as a waveguide whose height is about 300 nm and width about 700 nm. The modulator 200 comprises a first insulative layer (215*a* and 215*b*), formed of a lower layer of silicon nitride 215*a* having been formed by LPCVD in the same step as the silicon nitride waveguide 210. The height of the waveguide 210 is measured to the plane which contains the flat upper surface defined by the substantially flat boundary between the substrate 205 and the lower silicon nitride layer 215*a*.

The inventors have found that silicon nitride is a particularly effective waveguide material for electro-optic modulators and further, the lower layer of silicon nitride 215*a* permits conformal growth of the oxide upper layer 215*b*. The first insulative layer (215*a* and 215*b*) provides a substantially flat upper surface of hafnium oxide 215*b* upon which highly uniform graphene may be grown by CVD, including doped graphene, which provides the modulator 200 with improved performance over known devices. Accordingly, after patterning, the modulator 200 comprises a doped graphene monolayer 220 which extends at least over the entire width of the waveguide 210. This ensures that optimal modulation may be achieved.

The modulator 200 further comprises a second insulative layer which may again be formed from the same material as that of the upper layer 215*b* of the first insulative layer (215*a* and 215*b*) though any suitable material as described herein may be used. The second insulative layer 215*c* is therefore formed of hafnium dioxide upon which a transparent non-graphene electrode 225 is provided. Electrode 225 may be formed of IGZO and extends at least partially over a portion of the graphene layer 220 which extends over the waveguide channel 210.

Figure 3:
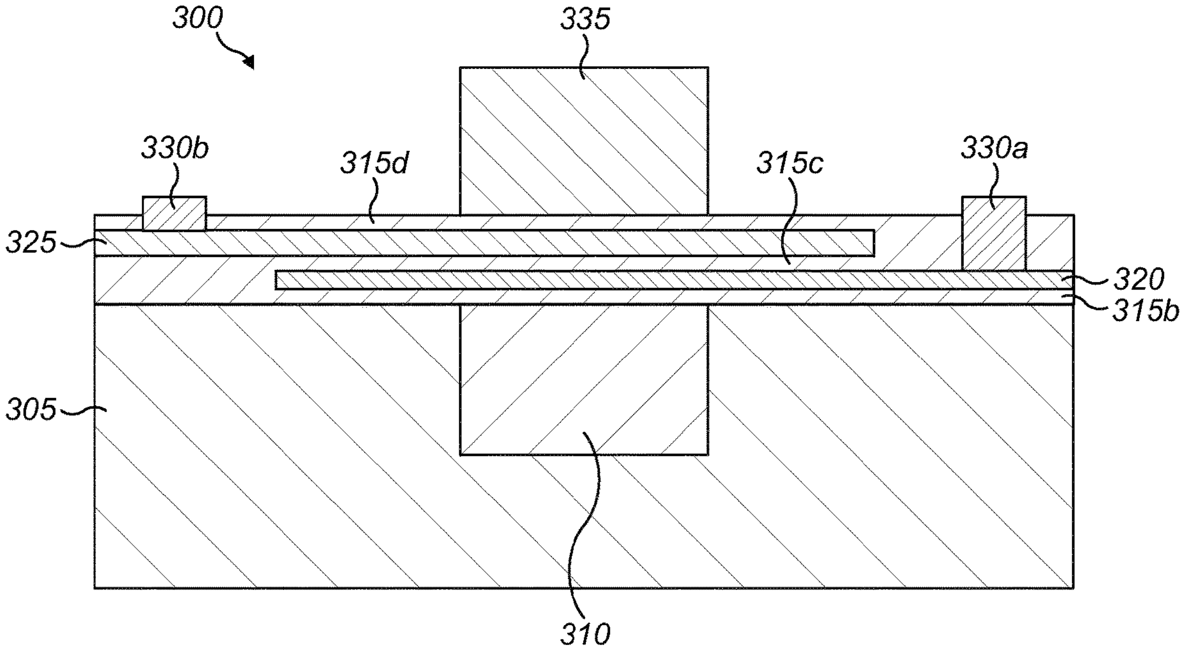
FIG. 3 is cross-sectional view of a further electro-optic modulator according to the present invention.

FIG. 3 provides a cross-sectional view of an electro-optic modulator comprising a second channel of waveguide material 335. As with modulators 100 and 200, the modulator 300 comprises a substrate 305 which again is preferably formed of silicon dioxide having a silicon nitride waveguide 310 embedded therein though any other suitable combination of substrates and waveguides may be used as is known in the art. The waveguide 310 may have a height of about 600 nm and a width of about 800 nm.

Modulator 300 comprises a first insulative layer 315*b* formed of aluminium magnesium oxide upon which a graphene layer 320 consisting of two graphene monolayers is provided. As will be appreciated, a graphene monolayer may also be preferred. The graphene layer 320 extends at least over the entire width of the waveguide channel 310 upon which a second insulative layer 315*c* of further aluminium magnesium oxide is formed. A non-graphene second electrode 325 is formed on the second insulative layer 315*c* and formed of amorphous silicon so as to also extend and overlap the entire width of the waveguide 310 and therefore the equivalent portion of the graphene layer 310 which extends over the waveguide 310. The second channel of waveguide material 335 is provided on a third insulative layer 315*d* formed of aluminium magnesium oxide and is provided substantially parallel to the first embedded channel of waveguide material 310. Accordingly, the first and second electrodes (320 and 325) equally underlap the second waveguide 335 and extend across its entire width.

Modulator 300 further comprises ohmic contacts (330*a* and 330*b*) in direct contact with the first and second electrodes (320 and 325). Specifically, a titanium/aluminium ohmic contact 330*a* is provided on the surface of the graphene layer 320 over 800 nm away horizontally from the waveguides (310 and 335). Similarly, a titanium/aluminium contact 330*b* is provided on the surface of the amorphous silicon contact 325 at a similar distance from the waveguides (310 and 335).

Figure 4:
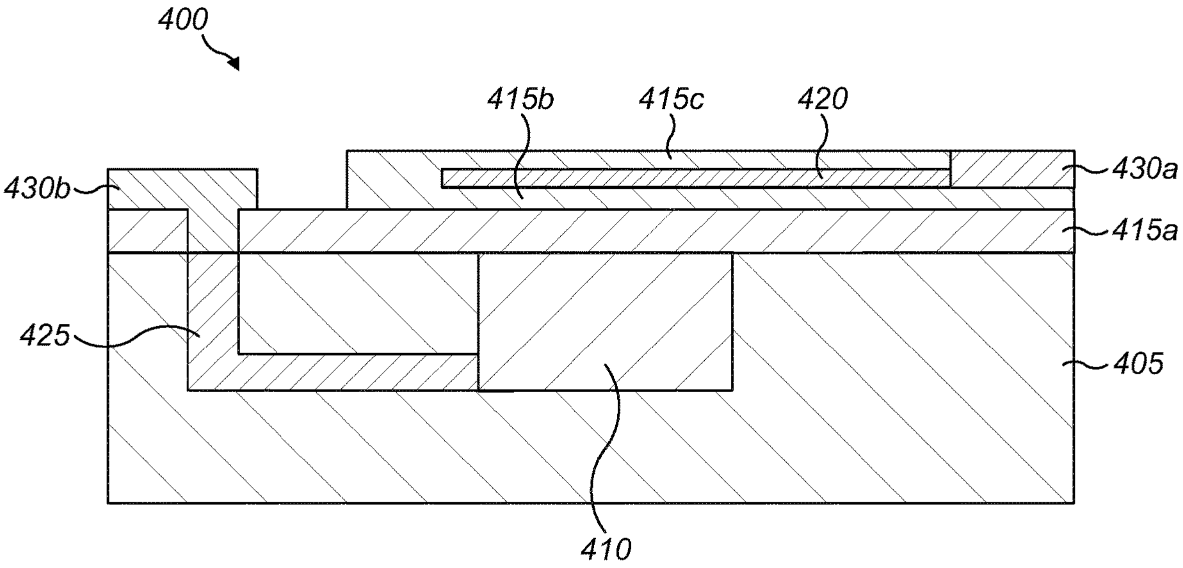
FIG. 4 is cross-sectional view of a further electro-optic modulator according to the present invention.

FIG. 4 is a cross-sectional view of an electro-optic modulator 400 which comprises a substrate 205 and channel of waveguide material 410 which is formed of moderately n-doped silicon (having a dopant concentration of about $10^{15}$ $cm^3$). The substrate 405 is further provided with a channel of heavily n-doped silicon 425 in contact and integrally formed with the waveguide 410. Together, channel 425 and the waveguide 410 provide the second electrode of the EOM 400 thereby necessarily underlapping the graphene monolayer 420 which extends over the entire width of the waveguide. The dopant concentration of the channel 425 is about $10^{18}$ $cm^{-3}$ and enables the waveguide 410 to operate as the second non-graphene electrode due to the electrical conductivity of n-doped silicon.

Modulator 400 further comprises a first insulative layer (415*a* and 415*b*) formed of a lower layer of silicon nitride 415*a* and an upper layer formed of aluminium oxide much like modulator 100. Similarly, the modulator 400 further comprises a graphene monolayer 420 on the aluminium oxide upper layer 415*a* of the first insulative layer and a protective aluminium oxide second insulative layer 415*c* is provide on and across the graphene layer 420.

The first and second insulative layers (415*a*, 415*b* and 415*c*) have been etched so as to expose the channel of n-doped silicon 425 at the surface of the substrate 405. Similarly, the second insulative layer has been etched together with a portion of the underlying graphene layer 420 so as to expose the edge of the graphene layer 420. The exposed portions of the graphene electrode 420 and the n-doped silicon channel 425 are themselves contacted with a nickel/aluminium ohmic contact (430*a* and 430*b*, respectively). As a result, the graphene layer 420 remains substantially encapsulated and protected from atmospheric contamination enabling the lifetime of the device to be improved since during use, atmospheric contaminants are prevented from undesirably doping the graphene.

As used herein, the singular form of "a", "an" and "the" include plural references unless the context clearly dictates otherwise. The use of the term "comprising" is intended to be interpreted as including such features but not excluding other features and is also intended to include the option of the features necessarily being limited to those described. In other words, the term also includes the limitations of "consisting essentially of" (intended to mean that specific further components can be present provided they do not materially affect the essential characteristic of the described feature) and "consisting of" (intended to mean that no other feature may be included such that if the components were expressed as percentages by their proportions, these would add up to 100%, whilst accounting for any unavoidable impurities), unless the context clearly dictates otherwise.

It will be understood that, although the terms "first", "second", etc. may be used herein to describe various elements, layers and/or portions, the elements, layers and/or portions should not be limited by these terms. These terms are only used to distinguish one element, layer or portion from another, or a further, element, layer or portion. It will be understood that the term "on" is intended to mean "directly on" such that there are no intervening layers between one material being said to be "on" another material. Spatially relative terms, such as "under", "below", "beneath", "lower", "over", "above", "upper" and the like, may be used herein for ease of description to describe one element or feature's relationship to another element(s) or feature(s). It will be understood that the spatially relative terms are intended to encompass different orientations of the device in use or operation in addition to the orientation depicted in the figures. For example, if a substrate or device as described herein is turned over, elements described as "under" or "below" other elements or features would then be oriented "over" or "above" the other elements or features. Thus, the example term "under" can encompass both an orientation of over and under. The EOM may be otherwise oriented and the spatially relative descriptors used herein interpreted accordingly.

The foregoing detailed description has been provided by way of explanation and illustration, and is not intended to limit the scope of the appended claims. Many variations of the presently preferred embodiments illustrated herein will be apparent to one of ordinary skill in the art, and remain within the scope of the appended claims and their equivalents.

The invention claimed is:

1. An electro-optic modulator comprising:

a substrate having a first channel of waveguide material embedded therein, the substrate and the waveguide material together providing a substantially flat upper surface, a first insulative layer on and across the upper surface, wherein the first insulative layer comprises a silicon nitride layer directly on the upper surface, and further comprises a metal oxide layer on the silicon nitride layer;

a graphene layer arranged on the first insulative layer and over at least a first portion of the first channel of waveguide material; and a second insulative layer provided on and across the graphene layer;

wherein the graphene layer provides a first electrode, and wherein a second electrode is either:

(i) provided on the second insulative layer at least overlapping the first portion of the first channel of waveguide material, or (ii) provided within the substrate at least underlapping the first portion of the first channel of waveguide material.

2. The electro-optic modulator according to claim 1, wherein the substrate comprises an upper layer of silicon dioxide on a lower layer of silicon and the first channel of waveguide material is embedded in the upper layer of silicon dioxide.

3. The electro-optic modulator according to claim 1, wherein the waveguide material is transparent to light across the range of 1250 nm to 1600 nm.

4. The electro-optic modulator according to claim 1, wherein the graphene is an optionally doped, monolayer graphene sheet.

5. The electro-optic modulator according to claim 1, wherein the first portion of the first channel of waveguide material extends across a width of the first channel of waveguide material.

6. The electro-optic modulator according to claim 1, wherein the second insulative layer comprises an oxide of one or more of aluminium, hafnium and magnesium.

7. The electro-optic modulator according to claim 1, wherein the second electrode is provided on the second insulative layer and is transparent.

8. The electro-optic modulator according to claim 1, wherein the second electrode is provided within the substrate and comprises n-doped silicon.

9. The electro-optic modulator according to claim 1, further comprising a second channel of waveguide material parallel to and aligned over the first channel of waveguide material and provided:

(i) on the second insulative layer when the second electrode is provided within the substrate; or (ii) on the second insulative layer and on the second electrode when the second electrode is provided on the second insulative layer; or (iii) provided on a third insulative layer provided on the second insulative layer and the second electrode when the second electrode is provided on the second insulative layer.

10. The electro-optic modulator according to claim 1, wherein the metal oxide layer is an oxide of one or more of aluminium, hafnium and magnesium.

11. The electro-optic modulator according to claim 1, wherein the waveguide material comprises $SiN_x$, the second electrode is provided on the second insulative layer, and the second electrode comprises ITO, InGaZnO or amorphous silicon.

12. The electro-optic modulator according to claim 1, wherein the waveguide material comprises unintentionally doped silicon, the second electrode is provided on the second insulative layer, and the second electrode comprises ITO, InGaZnO or amorphous silicon.

13. The electro-optic modulator according to claim 1, wherein the second electrode is provided within the substrate and the second electrode and the waveguide material are integrally formed from n-doped silicon.

14. The electro-optic modulator according to claim 1, wherein the second electrode is a non-graphene electrode.

15. A circuit comprising the electro-optic modulator according to claim 1.

16. An array comprising a plurality of electro-optic modulators according to claim 1.

17. A method of forming the electro-optic modulator according to claim 1 wherein the waveguide material comprises $SiN_x$ and the second electrode is provided on the second insulative layer, the method comprising:

providing a substrate having a first channel etched therein;

filing the first channel with $SiN_x$ and forming a layer of $SiN_x$ across the substrate by low pressure CVD;

at least partially etching the $SiN_x$ layer to form a substantially flat growth surface;

depositing a metal oxide on the growth surface to form the first insulative layer;

forming a graphene monolayer across the first insulative layer by CVD;

etching the graphene monolayer to form the first electrode;

depositing a metal oxide to form the second insulative layer; and providing the second electrode on the second insulative layer.

18. The method according to claim 17, wherein the step of depositing a metal oxide to form the first and/or second insulative layer is by ALD, e-beam, PECVD or PEALD, and wherein the metal oxide is of one or more of aluminium, hafnium and magnesium.

19. A method of forming the electro-optic modulator according to claim 1 wherein the waveguide material comprises unintentionally doped silicon and the second electrode is provided on the second insulative layer, the method comprising:

providing a substrate having a first channel etched therein;

filing the first channel with unintentionally doped silicon;

forming a layer of $SiN_x$ across the substrate and the first channel by low pressure CVD;

partially etching the $SiN_x$ layer to form a substantially flat growth surface;

depositing a metal oxide on the growth surface to form the first insulative layer;

forming a graphene monolayer across the first insulative layer by CVD;

etching the graphene monolayer to form the first electrode;

depositing a metal oxide to form the second insulative layer; and providing the second electrode on the second insulative layer.

* * * * *